United States Patent [19]

Webb

[11] Patent Number: 4,947,675

[45] Date of Patent: Aug. 14, 1990

[54] UNIDIRECTIONAL PIPE LINE PROVER

[75] Inventor: Robert A. Webb, Casey, Ill.

[73] Assignee: Marathon Oil Company, Findlay, Ohio

[21] Appl. No.: 271,131

[22] Filed: Nov. 14, 1988

[51] Int. Cl.⁵ ............................................. G01R 25/00
[52] U.S. Cl. ............................................................ 73/3
[58] Field of Search ............................................... 73/3

[56] References Cited

U.S. PATENT DOCUMENTS

| | | | |
|---|---|---|---|
| 3,232,090 | 2/1966 | Walker | 73/3 |
| 3,943,749 | 3/1976 | Van Scoy | 73/3 |
| 4,723,437 | 2/1988 | McKenzi | 73/3 |

Primary Examiner—Tom Noland

Attorney, Agent, or Firm—Jack L. Hummel

[57] ABSTRACT

A unidirectional pipe line flowmeter prover. Two calibrating spheres are used in connection with two support surfaces in the interchange conduit. Each support surface comprises a flexible liner mounted adjacent the interior of the interchange conduit so that upon being inflated it expands toward the center of the conduit. The liners are mounted so that when they are inflated they are vertically spaced, capable of trapping a sphere therebetween and sealing the interchange conduit. By timing the inflating and deflating of the liners two spheres are able to be alternately dropped into the prover and supported to assist in sealing the interchange conduit.

12 Claims, 2 Drawing Sheets

UNIDIRECTIONAL PIPE LINE PROVER

FIELD OF THE INVENTION

This invention relates to the calibration of a flow meter, often referred to as the proving of a pipe line. More particularly, it relates to a unidirectional pipe line prover of the type in which a sphere is moved through a calibrating loop in the pipe line.

BACKGROUND OF THE INVENTION

It is often necessary, particularly in the petroleum industry, to accurately determine the volume of fluid flowing through a pipe line. In order to ensure their continuing accuracy the flow meters used for this purpose have to be calibrated periodically. The calibration is commonly carried out by a method involving the introduction of a sphere into a calibrating loop connected to the pipe line. Because the diameter of the sphere is such that it contacts the inner surface of the calibrating loop conduit, fluid upstream from the sphere cannot flow past it, thus causing the sphere to travel at the same speed as the fluid. As it begins its travel through the loop the sphere contacts a switch which starts a counter that registers the flow measured by the meter. As the sphere ends its travel it contacts a second switch which stops the counter. By comparing the amount registered by the meter against the known volume of the flow path between the switches the flow meter can thus be calibrated.

Although the basic functioning of pipe line provers is well known, the method by which the sphere is introduced into the prover loop has varied a great deal. An interchange conduit normally connects the inlet and outlet of the loop at points just upstream from the first switch and just downstream from the second switch to allow the sphere to be introduced to the loop inlet and to be recaptured from the loop outlet. The sphere must be introduced in such a manner, however, that the interchange conduit is sealed during travel of the sphere through the loop so as to get an accurate measurement of the fluid flow rate. This has been accomplished in a variety of ways in the past, including the use of a piston or plunger to push a sphere from the interchange conduit into the inlet of the loop while at the same time forcing it through a small diameter portion of the conduit in order to maintain a seal between the sphere and the conduit. Such an arrangement is relatively elaborate and expensive, particularly for large diameter pipe lines, and requires that the sphere and interchange conduit be precisely dimensioned in order to ensure that the sphere can pass through the conduit in sealing engagement. In other arrangements mechanical stops are employed to hold the sphere in place in the interchange conduit, requiring a mechanism which allows the stops to be overcome or moved out of the way when the sphere is introduced into the inlet of the loop. Separate movable mechanical seals have also been employed in the interchange conduit.

It would be desirable to have a simple, inexpensive and relatively maintenance-free system for introducing spheres into the prover loop which assures that a seal will be maintained in the interchange conduit during calibration of the flow meter.

SUMMARY OF THE INVENTION

In accordance with the invention two vertically spaced sphere supports are provided in the interchange conduit, and means are provided for transversely moving the sphere supports toward and away from the axis of the conduit so as to enlarge and reduce the transverse area of the supports. The inside diameter of the interchange conduit is greater than the diameter of the spheres so that the spheres can normally freely pass through the conduit. When in enlarged condition the supports are able to support a calibrating sphere, and when in reduced condition they allow the sphere to pass through to the inlet of the prover loop.

The supports are comprised of flexible liners spaced from the inner surface of the interchange conduit. By inflating the liners they expand radially inwardly toward the axis of the conduit, and by deflating the liners they move back away from the axis toward the conduit wall. When both liner supports are inflated the sphere is trapped between them, forming a seal which prevents the flow of fluid through the interchange conduit during the calibration test. When the lowermost liner is deflated the sphere supported by it drops down into the inlet of the prover loop. When reinflated the liner is in position to support another sphere in the system.

The apparatus of the invention is extremely simple in construction yet is able to function reliably to achieve accurate calibration of the flow meter.

Other features and aspects of the invention, as well as other benefits thereof, will readily be ascertained from the more detailed description of the invention which follows.

DESCRIPTION OF THE PREFERRED EMBODIMENT

Figure 1:
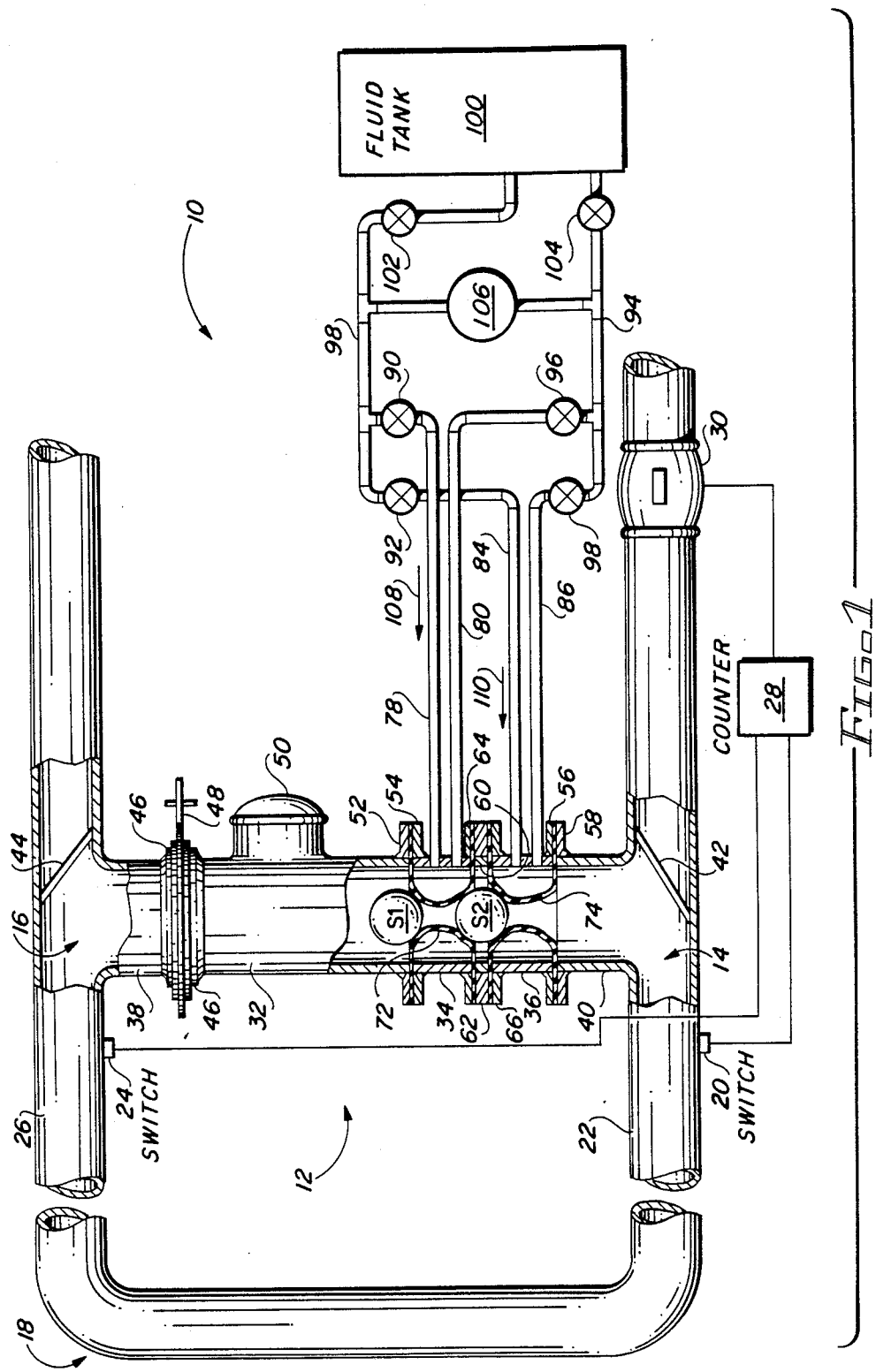
FIG. 1 is an elevational view, shown partially in section, of the pipe line prover of the invention.

Referring to FIG. 1, a pipe line prover assembly 10, connected to the main flow line, is comprised of a vertical interchange conduit 12 which extends between the inlet 14 and the outlet 16 of the loop 18. A switch 20 located in the lower horizontal run 22 of the loop 18 is positioned just downstream from the inlet 14. Another switch 24 located in the upper horizontal run 26 of the loop is positioned just upstream of the outlet 16. The switches 20 and 24 are electrically connected to a counter 28 which is electrically connected to the flow meter 30. This arrangement, which is well known in the art, causes the counter to begin registering the reading of the meter upon actuation of the switch 20 and to stop registering upon actuation of the switch 24.

Figure 2:
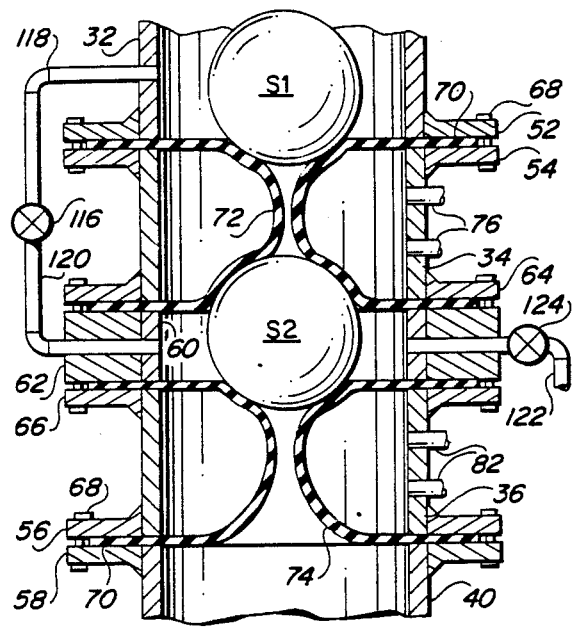
FIG. 2 is an enlarged sectional view of a portion of the interchange conduit of the pipe line prover.
Figure 3:
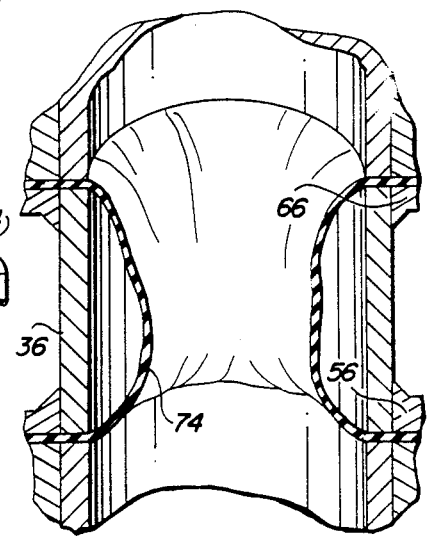
FIG. 3 is a partial pictorial view of a section of the interchange conduit, showing an installed liner.

Still referring to FIG. 1, and also to FIGS. 2 and 3, the interchange conduit 12 comprises pipe sections 32, 34 and 36, with the end sections 32 and 36 being connected to T-sections 38 and 40. The inside diameters of the pipe sections forming the vertical interchange conduit are somewhat larger than the inside diameters of the pipe sections forming the loop 18 and the main flow lines for a reason which is made clear hereinafter. The horizontal leg of the T-section 40 contains one or more bars 42, attached to the interior of the pipe as by welding, to assist in directing a falling sphere in the downstream direction. One or more bars 44 are also attached to the interior of the horizontal leg of the T-section 38 to prevent movement of a sphere downstream beyond the prover loop. If more than one bar is installed at either location they would be spaced apart so as not to obstruct the flow of fluid through the pipe.

The T-section 38 is connected to the pipe section 32 by conventional annular flanges 46 which also act to secure gate valve 48 in place. The pipe section 32 also includes a hatch type closure 50 which can be used to insert and retrieve spheres from the loop when necessary. It will be understood that the hatch would be opened only after closing the gate valve.

The pipe sections 32 and 34 are connected, as by threads, to flanges 52 and 54, respectively. Similarly, flanges 56 and 58 are connected to section 32 and to T-section 40. A short pipe section 60 is provided between the sections 34 and 36, and a flange 62 is connected to it. Flanges 64 and 66 are connected to the pipe sections 34 and 36, respectively, and abut the flange 62. Adjacent flanges may be connected by spaced bolts 68, and appropriate seals 70 may be provided between the adjacent flanges.

A flexible tubular liner 72 is positioned in the conduit 12 with its upper end clamped between the flanges 52 and 54 and its lower end clamped between flanges 62 and 64. In like manner a liner 74 is positioned in the conduit so that its lower end is clamped between the flanges 56 and 58 and its upper end is clamped between flanges 62 and 66. The pipe section 34 is provided with ports 76 to which fluid lines 78 and 80 are attached, and the pipe section 36 is provided with ports 82 to which fluid lines 84 and 86 are attached. The fluid lines 78 and 84 lead to a discharge manifold 88 through valves 90 and 92, while the fluid lines 80 and 86 lead to a suction manifold 94 through valves 96 and 98. The discharge and suction manifolds 88 and 94 are connected to a fluid tank 100 through valves 102 and 104. The manifolds are further connected to pump 106. This arrangement enables fluid from the tank 100 to be pumped into or withdrawn from the annulus formed by the liner 72 and pipe section 34 as well as to and from the annulus formed by the liner 74 and the pipe section 36, which acts to inflate or deflate the liners. The valves may be controlled by solenoids to cause them to respond quickly. Although not shown, the tank may be provided with an overflow line for safety and a high level switch for closing the solenoid valves to prevent fluid in the pipe line from overflowing the system in the event of a liner rupture. Obviously any desired arrangement for delivering fluid to an annulus may be utilized and need not be limited to the arrangement shown.

As is well known in the art the calibrating spheres are preferably hollow balls formed of an elastic material such as polyurethane, for example, which are inflated with suitable fluid such as liquid anti-freeze or water, depending upon the site of the pipe line prover. This allows the spheres to correspond in size to the inside diameter of the prover loop while remaining somewhat compressible, thereby permitting them to maintain a seal with the inner wall of the loop while moving through the prover loop. Since the inside diameter of the conduit 12 is greater than the inside diameter of the prover loop, the spheres would readily pass through the conduit 12 if it were unobstructed. When the liners 72 and 74 are inflated, however, they protrude radially inwardly toward the axis of the conduit a sufficient distance to prevent passage of the spheres and, as shown in FIGS. 1 and 2, they have sufficient rigidity to support the spheres S1 and S2. As shown more clearly in FIG. 2, the sphere S2 is not only supported by the inflated liner 74, but the liners are spaced such that the upper portion of the sphere is in contact with the inflated liner 72, thus trapping the sphere between the liners. The sphere and the inflated liners act as a seal, preventing fluid from flowing through the interchange conduit.

Figure 4:
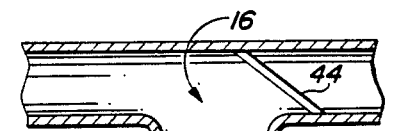
FIG. 4 is a sectional view of the interchange conduit, showing the upper liner in inflated condition and the lower liner in deflated condition.
Figure 5:
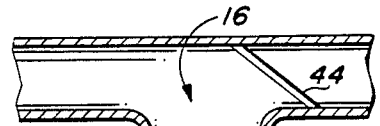
FIG. 5 is a view similar to that of FIG. 4, but showing the upper liner in deflated condition and the lower liner in inflated condition.

In operation, the system of the invention utilizes two spheres. At the beginning of the operation the spheres S1 and S2 are supported on inflated liners 72 and 74, respectively, as shown in FIG. 1. The arrows 108 and 110 indicate that fluid has been introduced to the liners 72 and 74 through valves 102, 90 and 92 and lines 78 and 84. The solenoid valve 92 is then closed and valve 98 is opened, causing fluid to flow through from the liner 74 through line 86 in the direction of the arrow 112 back to the tank 100. This causes the liner 74 to be deflated. As shown in FIG. 4, when this happens the sphere S2 is no longer supported and thus drops down through the conduit 12 into the inlet 14 of the prover loop. As soon as the sphere S2 drops, the solenoid valves 90, 92, 96 and 98 are reversed, causing fluid to flow through line 80 in the direction of arrow 114 and through line 84 in the direction of arrow 110. As a result the liner 74 is reinflated and the liner 72 is deflated, thereby allowing the sphere S1 to drop down from the position shown in FIG. 4 to the position shown in FIG. 5. Sphere S1 now occupies the position vacated by sphere S2. Liner 72 is then immediately reinflated to trap the sphere S1 between the two inflated liners 72 and 74 to bring it into the same position in which sphere S2 is shown in FIG. 2. The contact between sphere S1 with inflated liners 72 and 74 forms a fluid seal in the conduit 12 to prevent fluid flow through the conduit during travel of the sphere S2 through the prover loop.

To enable the operator to determine whether a sphere trapped between inflated liners has formed a true seal with the liners, a differential pressure gauge 116 may be connected through lines 118 and 120 to the interior of pipe sections 32 and 60. In addition, a visual indicator may be provided by bleed line 122 connected through shutoff valve 124 to the interior of pipe section 60.

It will be understood that the deflating and reinflating of the liner 72 and the subsequent deflating and reinflating of the liner 74 all takes place prior to the sphere S2 making contact with the switch 20 and starting the meter counting process. This is necessary in order to ensure that a fluid seal exists in the conduit 12 before the switch 20 is actuated. The sphere S2 is thus swept along by a true representation of the pipe line flow, not a flow modified by leakage of fluid through the conduit 12. Such rapid reversals of inflating fluid into and out of the liner annuluses can readily be brought about by the solenoid valve arrangement explained above or by any other suitable hydraulic arrangement capable of such action. In any case the solenoids or other actuating means would be controlled by suitable circuitry, not shown since the specific controlling means employed does not form a part of the invention and is well within the design scope of one skilled in the art.

After the sphere S2 actuates the switch 24 it continues on into the outlet 16 where it strikes the grate or bars 44, by which it is directed downwardly into the conduit 12. As is well known, the spheres are designed so that their specific gravity is greater than that of the pipe line fluid, permitting the spheres to descend through the fluid in the conduit 12. The descent of the sphere S2 is stopped by the inflated liner 72, after which the now-trapped sphere S1 would either be released to start another calibration run or would be retained in its trapped position to await release at a later time. The spheres at this point would again be positioned as shown in FIG. 1, except that the particular spheres would be reversed, with sphere S2 being uppermost and sphere S1 being lowermost.

It will now be appreciated that the invention provides an extremely simple but reliable method of introducing spheres into a prover loop without the use of complicated mechanical arrangements. By simply controlling the expansion and retraction of liners in the interchange conduit the spheres are launched into the prover loop while at the same time maintaining a fluid seal in the conduit during the travel of the sphere through the loop. Only two spheres are required in the system, one forming an integral part of the seal while the other is traveling through the loop.

It should now be understood that the invention is not necessarily limited to all the specific details described in connection with the preferred embodiment, but that changes to certain features of the preferred embodiment which do not affect the overall basic function and concept of the invention may be made by those skilled in the art without departing from the spirit and scope of the invention, as defined in the appended claims.

What is claimed is:

1. In a unidirectional pipe line prover having an inlet, a calibrated prover section, an outlet and an interchange conduit connecting the inlet and outlet, wherein fluid flowing through the prover pushes a calibration sphere through the prover section, the improvement comprising:
    first and second annular sphere support means in the interchange conduit positioned radially outwardly of a central axis of the conduit;
    the second sphere support means being upwardly spaced from the first sphere support means; and
    means for radially moving the annular sphere support means toward and away from the central axis of the interchange conduit so as to enlarge and reduce the transverse area of the sphere support means;
    the first and second support means, when in enlarged condition, being able to support a calibrating sphere, and when in reduced condition allowing the sphere to pass through the interchange conduit.

2. The improvement in a unidirectional pipe line prover according to claim 1, wherein the inside diameter of the interchange conduit is greater than the inside diameter of the prover section.

3. The improvement in a unidirectional pipe line prover according to claim 1, wherein the first and second support means are spaced such that when in enlarged condition they are adapted to trap a calibrating sphere therebetween.

4. The improvement in a unidirectional pipe line prover according to claim 3, wherein the first and second support means, when in enlarged condition and with a sphere trapped therebetween, seal the interchange conduit against fluid flow.

5. In a method for unidirectionally providing a pipe line utilizing a prover loop having an inlet, a calibrated prover section, an outlet and an interchange conduit connecting the inlet and outlet, wherein fluid flowing through the prover section pushes a calibration sphere therethrough, the improvement comprising:
    supporting a first calibrating sphere on a first annular sphere support means positioned in the interchange conduit radially outwardly of a central axis thereof;
    supporting a second calibrating sphere on a second annular sphere support means positioned in the interchange conduit radially outwardly of the central axis thereof, the second annular support means being upwardly spaced from the first sphere support means;
    radially reducing the amount of support surface of the first sphere support means to allow the first calibrating sphere to fall through the interchange conduit and into the inlet of the prover;
    radially increasing the amount of support surface of the first sphere support means to a size enabling the first support means to support a calibrating sphere; and
    radially reducing the amount of support surface of the second sphere support means to allow the second calibrating sphere to fall onto the first sphere support means.

6. The improvement in a method for unidirectionally proving a pipe line according to claim 5, including the further step of radially enlarging the amount of support surface of the second sphere support means so as to capture and support the first calibration sphere after it reenters the interchange conduit.

7. The improvement in a method for unidirectionally providing a pipe line according to claim 6, wherein the first and second sphere support means are spaced such that when in enlarged condition they are adapted to trap a calibrating sphere therebetween and seal the interchange conduit against fluid flow.

8. In a unidirectional pipe line prover having an inlet, a calibrated prover section, an outlet and an interchange conduit connecting the inlet and outlet, wherein fluid flowing through the prover pushes a calibration sphere through the prover section, the improvement comprising:
    first and second sphere support means in the interchange conduit;
    the second sphere support means being upwardly spaced from the first sphere support means;
    means for transversely moving the sphere support means toward and away from the axis of the interchange conduit so as to enlarge and reduce the transverse area of the sphere support means;
    the first and second support means, when in enlarged condition, being able to support a calibrating sphere, and when in reduced condition allowing the sphere to pass through the interchange conduit; and
    the first and second support means being radially expandable.

9. The improvement in a unidirectional pipe line prover according to claim 8, wherein each sphere support means comprises flexible liner means in the interchange conduit and means mounting the liner means so as to provide a sealed annular between the liner means and the interchange conduit.

10. The improvement in a unidirectional pipe line prover according to claim 9, wherein the means mounting the liner means so as to provide a sealed annular between the liner means and the interchange conduit comprises means for introducing fluid into the annular to inflate the liner means and for withdrawing fluid from the annular to deflate the liner means.

11. In a method for unidirectionally providing a pipe line utilizing a prover loop having an inlet, a calibrated prover section, an outlet and an interchange conduit connecting the inlet an doublet, wherein fluid flowing through the prover section pushes a calibration sphere therethrough, the improvement comprising:
   supporting a first calibrating sphere on a first sphere support means in the interchange conduit;
   supporting a second calibrating sphere a second sphere support means upwardly spaced from the first sphere support means;
   transversely reducing the amount of support surface of the first sphere support means to allow the first calibrating sphere to fall through the interchange conduit and into the inlet of the prover;
   transversely increasing the amount of support surface of the first sphere support means to a size enabling the first support means to support a calibrating sphere;
   transversely reducing the amount of support surface of the second sphere support means to allow the second calibrating sphere to fall onto the first sphere support means;
   transversely enlarging the amount of support surface of the second sphere support means to as to capture and support the first calibration sphere after it reenters the interchange conduit;
   the first and second sphere support means being spaced such that when in enlarged condition they are adapted to trap a calibrating sphere therebetween and seal the interchange conduit against fluid low; and
   the first and second support means being radially expandable.

12. The improvement in a method for unidirectionally providing a pipe line according to claim 11, wherein each sphere support means comprises flexible liner means in the interchange conduit and means mounting the liner means so as to provide a sealed annular between the liner means and the interchange conduit, and wherein the method further includes the steps of inflating the liner means to transversely enlarged the support surface thereof and deflating the liner means to transversely reduce the support surface thereof.

* * * * *

UNITED STATES PATENT AND TRADEMARK OFFICE
CERTIFICATE OF CORRECTION

PATENT NO. : 4,947,675

DATED : August 14, 1990

INVENTOR(S) : Robert A. Webb

It is certified that error appears in the above-identified patent and that said Letters Patent is hereby corrected as shown below:

| | |
|---|---|
| Col. 6, line 63: | Delete "annular" and insert --annulus--. |
| Col. 6, line 67: | Delete "annular" and insert --annulus--. |
| Col. 7, line 1: | Delete "annular" and insert --annulus--. |
| Col. 7, line 3: | Delete "annular" and insert --annulus--. |
| Col 7, line 4: | Delete "providing" and insert --proving-- |
| Col. 7, line 7: | Delete "an doublet" and insert --and outlet--. |
| Col. 7, line 12: | After "sphere" insert --on--. |
| Col. 8, line 4: | Delete "to" (first occur) and insert --so--. |
| Col. 8, line 19: | Delete "annular" and insert --annulus--. |
| Col. 8, line 21: | Delete "enlarged" and insert --enlarge--. |

Signed and Sealed this

Tenth Day of March, 1992

Attest:

HARRY F. MANBECK, JR.

*Attesting Officer*        *Commissioner of Patents and Trademarks*